United States Patent [19]

DeHaan

[11] Patent Number: 4,544,613
[45] Date of Patent: Oct. 1, 1985

[54] ELECTROCHEMICAL CELL HAVING CONTINUOUS DEPLETION GAUGE

[75] Inventor: Abel DeHaan, Pembroke Pines, Fla.

[73] Assignee: Cordis Corporation, Miami, Fla.

[21] Appl. No.: 669,605

[22] Filed: Nov. 8, 1984

[51] Int. Cl.[4] .............................................. H01M 10/48
[52] U.S. Cl. ...................................... 429/91; 429/178; 429/196
[58] Field of Search ....................... 429/91, 90, 92, 93, 429/178, 196

[56] References Cited

U.S. PATENT DOCUMENTS 4,136,234  1/1979  Fritts ................................... 429/178
4,388,380  6/1983  DeHaan et al. ....................... 429/91

Primary Examiner—Charles F. LeFevour
Attorney, Agent, or Firm—Henry W. Collins; Thomas R. Vigil

[57] ABSTRACT

The electrochemical cell comprises an outer conductive housing, a cathode material within the housing and in direct electrical contact with the housing, and at least one anode material within the housing. The anode material includes first and second major surfaces and is separated from the cathode material by porous insulating separators, and an electrolyte is contained within the housing and within the porous insulating separators. A resistive strip member is positioned within the anode material and extends generally diagonally therethrough and has an insulative layer thereon for insulating the strip member from the anode material. The insulative layer has conductive passageways therethrough for electrically connecting the anode materalial with the resistive strip member. An electrical conductor connected to the proximal end of the strip member extends out of and is insulated from the conductive housing whereby an initial voltage potential is developed between the electrical conductor and the housing. The conductive passageways are exposed one by one to the electrolyte and rendered nonconductive thereby as the anode material is consumed. This results in an increase of resistance in series with the conductor, the increase in resistance of the strip member as the anode material is consumed serving to indicate the level of discharge of the cell.

33 Claims, 8 Drawing Figures

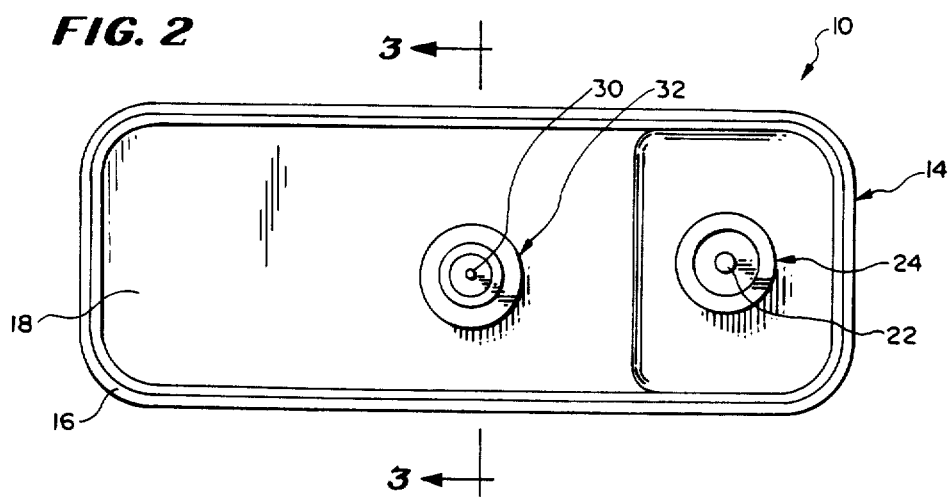
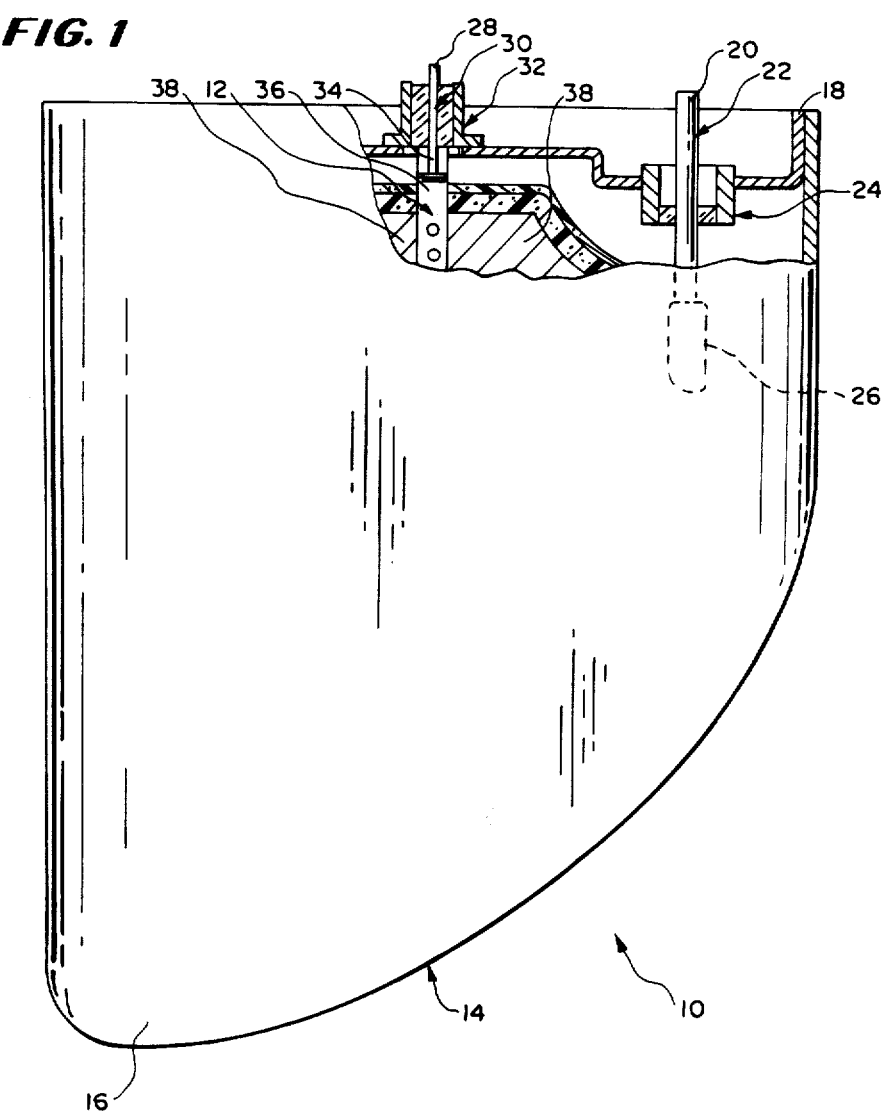

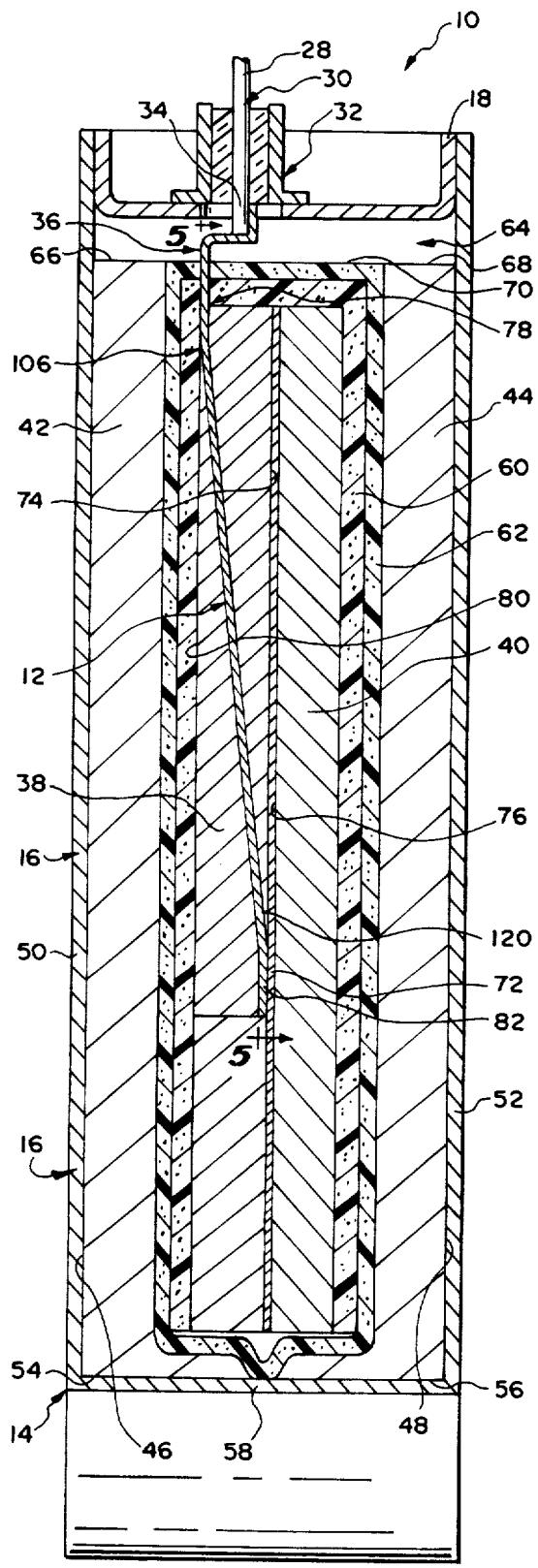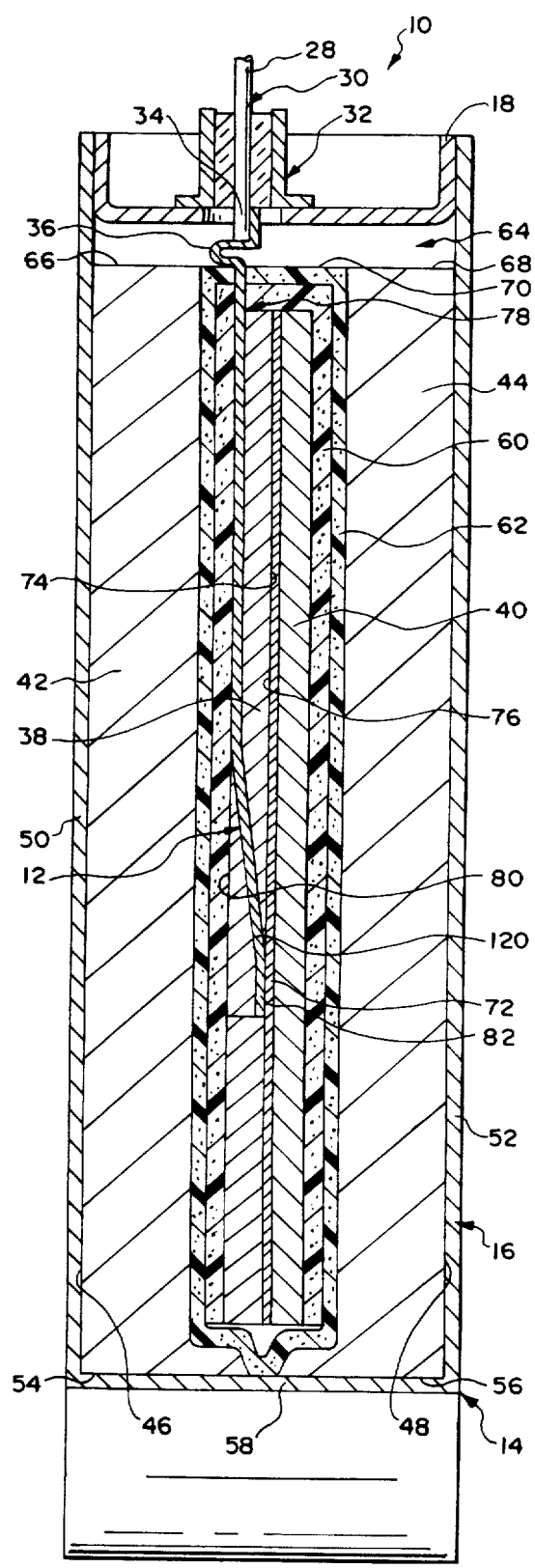

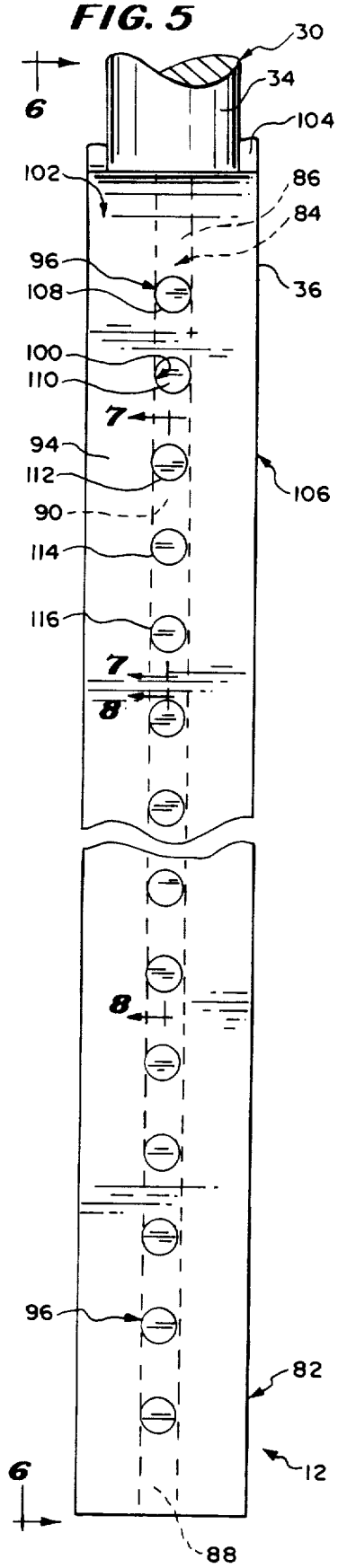
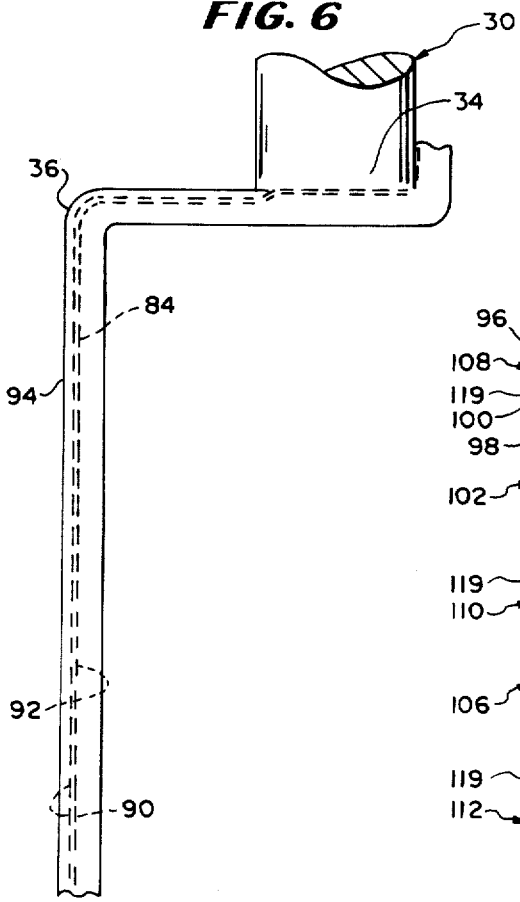
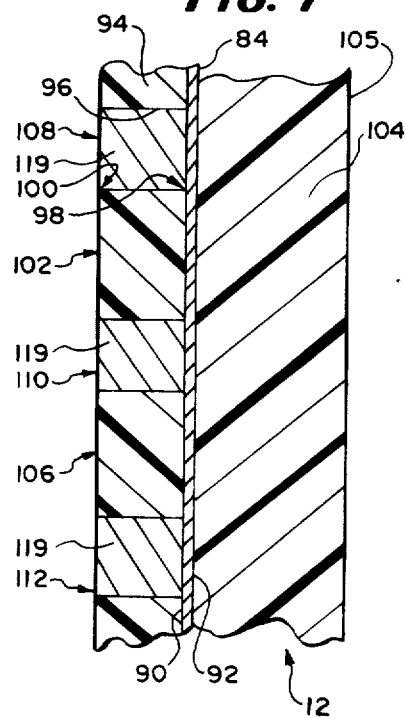
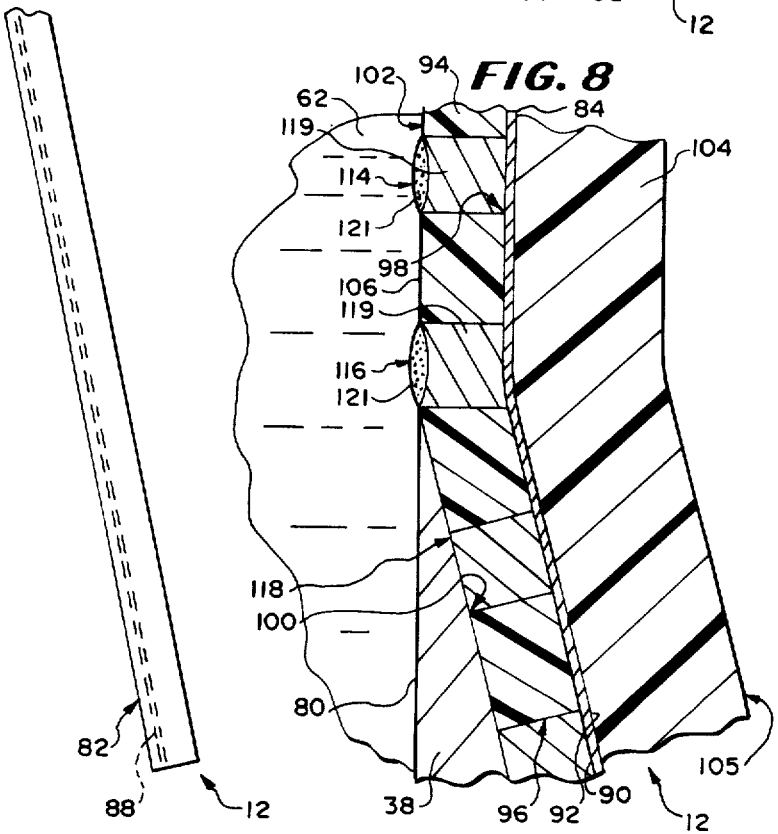

ELECTROCHEMICAL CELL HAVING CONTINUOUS DEPLETION GAUGE

BACKGROUND OF THE INVENTION

1. Field of the Invention

The present invention relates to an electrochemical cell having a depletion gauge comprising an insulated resistive strip member which is positioned within the anode material of the cell and which is adapted to develop an increasing electrical resistance within the cell as the anode material is consumed, the increase in resistance serving to indicate the approaching end of life of the cell.

2. Description of the Prior Art

Heretofore, various electrochemical cells have been proposed which include depletion gauges which are adapted to indicate a decrease in voltage potential of the cell and the approaching end of life of the cell.

Examples of such previously proposed electrochemical cells are disclosed in the following U.S. patents:

| U.S. PAT. NO. | PATENTEE |
|---|---|
| 4,136,234 | Fritts |
| 4,388,380 | DeHaan et al |

The Fritts U.S. Pat. No. 4,136,234 discloses a charge sensing electrode for a primary battery which includes a sensing grid which is positioned within an electrochemical cell on or near the surface of a porous cathode within the cell and facing a separator and an anode within the cell. The voltage which is measured between the sensing grid and a cathode current collector grid is a function of the current distribution within the electrode which is continuously changing as the battery discharges, thereby indicating the state of charge of the cell.

The DeHaan et al U.S. Pat. No. 4,388,380 discloses a lithium cell having a depletion gauge which includes a lithium anode comprising two lithium plates wherein one of the lithium plates includes a stepped portion to thereby form a gap between the two lithium plates. A conductive sensing element is positioned within the gap and is in electrical contact with one of the lithium plates and is electrically insulated from the other lithium plate. An electrical potential which is developed between the conductive sensor and an outer conductive housing of the cell decreases to zero volts when the lithium plate in contact with the conductive sensor has become consumed to thereby provide an indication of a predetermined level of discharge of the cell.

Also in copending application Ser. No. 518,220 filed July 28, 1983 now U.S. Pat. No. 4,479,864 for: LITHIUM CELL HAVING CONTINUOUS DEPLETION GAUGE, there is disclosed a cell in which an elongate electrically resistive strip member is insulated on one side by an elongate strip of insulating material and is in contact on the other side with an anode material. The resistive strip member extends diagonally through the anode material and in a serpentine path between the upper and lower ends of the strip of insulating material such that as the anode material is consumed, a portion of the strip member is not in contact with anode material and is exposed to electrolyte. The greater the length of the exposed strip member, the more resistance in a sensing circuit, which serves to indicate the amount of discharge of the cell.

As will be described in greater detail hereinafter, the electrochemical cell of the present invention differs from the electrochemical cells previously proposed by providing a completely insulated resistive strip member which is positioned within the anode material of the cell and which is adapted to couple an increasing electrical resistance within the cell as the anode material is consumed. The resistive strip member includes a first layer of insulative material on a first major surface of the strip member and a second layer of insulative material on a second major surface of the strip member thereby to insulate the strip member from the anode material. The first layer of insulative material includes a plurality of passageways which contain conductive material therein that, upon exposure to an electrolyte as the anode material is consumed, has an electrochemical reaction with the electrolyte that forms a nonconductive layer and connects more electrical resistance of the strip member between the anode material and a conductor, the increase in resistance serving to indicate the approaching end of life of the cell.

SUMMARY OF THE INVENTION

According to the invention, there is provided an electrochemical cell comprising an outer conductive housing, a cathode material within the housing and in direct electrical contact with the housing, and at least one anode material within the housing. The anode material includes first and second major surfaces and is separated from the cathode material by porous insulating separators. An electrolyte is contained within the housing and within the porous insulating separators. An insulated conductive resistive strip member is positioned within the anode material and has a distal end and a proximal end and extends diagonally through the anode material between the major surfaces of the anode material. An electrical conductor is connected to the proximal end of the strip member, extends out of, and is insulated from the conductive housing so that an initial voltage potential is developed between the electrical conductor and the housing. Electrical connections are provided from the conductive strip member through an insulation covering to the anode material. The electrical connections, when exposed to the electrolyte as the anode material is consumed, are rendered non-conductive thereby to place more of the resistive strip and its resistance in the circuit to the electrical conductor. This increasing resistance as the anode material is consumed serves to indicate the level of discharge of the cell. The resistance of the conductive strip member or sensor is measured by applying a sinusoidal voltage pulse of about 1 v (peak-to-peak) and 1 kilo hertz across the sensor. The pulse duration may be 1 second or longer.

BRIEF DESCRIPTION OF THE DRAWINGS

FIG. 1 is a side elevational view, shown partly in section, of an electrochemical cell having a depletion gauge constructed in accordance with the teachings of the present invention.

FIG. 2 is a top view of the electrochemical cell illustrated in FIG. 1.

FIG. 3 is a sectional view of the electrochemical cell shown in FIG. 2 and is taken along line 3—3 of FIG. 2 prior to depletion of the anode material within the electrochemical cell.

FIG. 4 is a sectional view of the electrochemical cell similar to the view illustrated in FIG. 3 also taken along line 3—3 of FIG. 2 and illustrates partial depletion of the anode material within the electrochemical cell.

FIG. 5 is a front elevational view of the depletion gauge of the present invention.

FIG. 6 is a side elevational view of the depletion gauge of the present invention and is taken along line 6—6 of FIG. 5.

FIG. 7 is a sectional view of the depletion gauge shown in FIG. 5 and is taken along line 7—7 of FIG. 5.

FIG. 8 is a sectional view of the depletion gauge shown in FIG. 5 and is taken along line 8—8 of FIG. 5.

DESCRIPTION OF THE PREFERRED EMBODIMENT

Referring now to FIGS. 1 and 2, there is illustrated therein an electrochemical cell 10 which has therein a continuous depletion gauge 12 for the end of life indication of the cell 10 constructed in accordance with the teachings of the present invention.

The cell 10 includes a housing 14 defined by an outer conductive case 16 which is made of an electrically conductive material, such as stainless steel, and a lid member 18, which is also made of an electrically conductive material, such as stainless steel, and which is permanently fixed to the top of the conductive case 16.

A distal end 20 of an anode lead 22 extends through the lid member 18 by way of a glass-to-metal seal 24, and a proximal end 26 (shown in phantom in FIG. 1) of the anode lead 22 is flattened for making electrical contact with an anode material (not shown) within the cell 10.

As will be described in greater detail hereinafter, a distal end 28 of a conductive sensing wire 30 also extends through the conductive lid member 18 by way of a glass-to-metal seal 32, and a proximal end 34 of the conductive sensing wire 30 is electrically connected to a proximal end 36 of the continuous depletion gauge 12 of the present invention which is disposed within a first anode material 38 within the cell 10.

Referring now to FIGS. 3 and 4, FIG. 3 illustrates the cell 10 and the depletion gauge 12 prior to any electrical load being placed on the cell, such as the load of a cardiac pacer applied to the cell 10. Similarly, FIG. 4 illustrates the cell 10 and the depletion gauge 12 after the first anode material 38 and a second anode material 40 have been partially depleted, the depletion gauge 12 thereby indicating a predetermined level of discharge of the cell 10.

The depletion gauge 12 is shown as a continuous metal strip in FIGS. 3 and 4 for the sake of illustration but, as will be described below in connection with the description of FIGS. 5-8, is a thin metal strip member (84—FIG. 7) embedded between two layers (94 and 104—FIG. 7) of insulating material.

As further illustrated in FIGS. 3 and 4, two cathode materials 42, 44 are positioned within the conductive case 16 and include two major contact surfaces 46, 48 which are in direct electrical contact with two side walls 50, 52 of the conductive case 16, and further include two lower contact surfaces 54, 56 which are in direct electrical contact with a bottom wall 58 of the conductive case 16.

The first and second anode materials 38, 40, which are preferably made of lithium, are interposed between the cathode materials 42, 44 and are spaced from the cathode materials 42, 44 and held tightly together in side-by-side configuration by an inner insulative separator 60 and an outer insulative separator 62. The insulative separators 60, 62 are made of a porous material and electrically insulate the first and second anode materials 38, 40 from the cathode materials 42, 44. As will be discussed in greater detail hereinafter, the insulative separators 60, 62 also serve to store an electrolyte, and the electrolyte also fills an open area 64 located below the lid member 18 and above upper end portions 66, 68 of the cathode materials 42, 44 and an upper portion 70 of the outer insulative separator 62.

A conductive current collector 72 is positioned between and is in direct electrical contact with first major contact surfaces 74, 76 of each of the anode materials 38, 40, respectively. The current collector 72 includes a proximal end (not shown) which is in direct electrical contact with the proximal end 26 of the anode lead member 22 (FIG. 2) which extends through both of the insulative separators 60, 62 and through the lid member 18 and through the glass-to-metal seal 24 which insulates the anode lead member 22 from the cathode materials 38, 40 and the lid member 18. In this manner, the distal end 20 of the anode lead member 22 forms a negative terminal for the cell 10.

Referring again to FIGS. 3 and 4, the first anode material 38 is provided with an elongate slot or opening 78 which extends in a generally downward direction on a diagonal of the first anode material 38 on an angle from a second major surface 80 of the first anode material 38 to the first major surface 74 of the first anode material 38. As will be described in greater detail hereinafter, the depletion gauge 12 has dimensions approximately equal to the dimensions of the elongate slot 78 and is inserted into and disposed within the elongate slot 78 so that the proximal end 36 of the depletion gaugae 12 is coplanar with the second major surface 80 of the first anode material 38 and the distal end 82 of the depletion gauge 12 is coplanar with the first major surface 74 of the first anode material 38. As the first anode material 38 is depleted, the depletion gauge 12 is coplanar with an increasingly larger surface area of the second major surface 80 of the anode material 38 (FIG. 4).

Alternatively, the depletion gauge 12 can be molded into the first anode material 38 when it is formed.

Referring now to FIGS. 5, 6, 7 and 8, the depletion gauge 12 is generally rectangular in cross-section and includes an elongate resistive strip member 84 (shown in phantom in FIGS. 5 and 6) having a proximal end 86 and a distal end 88 and which is made of an electrically conductive material, preferably nichrome, and having a resistance along its length of approximately 5000 ohms. The strip member 84 is preferably approximately 0.010 inch wide, 500 angstroms thick, and 0.50 inch long and includes first and second major surfaces 90 and 92.

The first surface 90 of the strip member 84 has a first layer of insulating material 94 thereon which insulates substantially the entire first surface 90 of the strip member 84 from the first anode material 38, and is approximately 0.050 inch wide, 0.002 inch thick and 0.50 inch long. The first layer of insulating material 94 is made of a nonconductive material, preferaly polyimide, and includes a plurality of passageways 96 extending perpendicularly therethrough relative to the strip member 84 and spaced apart along a line extending axially the length of the strip member 84. Each passagaeway is preferably circular in cross-section and has a diameter approximately equal to the width of the strip member 84. Also, each of the passageways has a proximal opening 98 and a distal opening 100, the proximal opening 98 being adjacent to and coplanar with the first surface 90 of the strip member 84 and the distal opening 100 being adjacent to and coplanar with an outer surface 102 of the first insulating layer 94.

The second surface 92 of the strip member 84 has a second layer of insulating material 104, preferably made of Halar ®, which insulates the second surface 92 of the strip member 84 from the first anode material 38 and which is approximately 0.050 inch wide, 0.005 inch thick and 0.50 inch long. The layers 94 and 104 are longer and wider than the strip member 84 and are sealed together about the periphery of the strip member 84 except for the proximal end 86 thereof.

The proximal end 36 of the depletion gauge 12 extends through the inner and outer insulative separators 60, 62 and into the open area 64 (FIGS. 3 and 4), and the proximal end 86 of the strip member 84 is uninsulated and is in direct electrical contact with and electrically connected to the proximal end 34 of the sensing wire 30.

It is to be appreciated that according to the teachings of the present invention, a portion 106 of the outer surface 102 of the first layer of insulating material 94 of the depletion gauge 12, located a short distance below the proximal end 36 of the depletion gauge 12, is coplanar with the second major surface 80 of the first anode material 38 so that the distal openings 100 of five upper passageways 108, 110, 112, 114 and 116 are coplanar with the second major surface 80 of the first anode material 38 and are adjacent to the inner porous insulative separator 60. At a location between the fifth passageway 116 and the sixth passageway 118 (FIG. 8), the depletion gauge 12 is formed at approximately a 10° angle so that the depletion gauge 12 extends downwardly and generally diagonally of the first anode material 38 and then on approximately a 10 angle within the elongate slot 78 and within the first anode material 38. The distal end 82 of the depletion gauge 12 is also formed at approximately a 10 angle so that the distal end 82 of the depletion gauge 12 extends downwardly and parallel to the first major surface 74 of the first anode material 38, an outer surface 105 of the second insulative layer 104 of the distal end 82 of the depletion gauge 12 being coplanar with the first major surface 74 of the first anode material 38.

According to the teachings of the present invention, each passageway 96 contain a plug 119 made of an electrically conductive material which is readily oxidizable by the electrolyte which is contained within the inner and outer insulative separators 60, 62 and within the open area 64. The electrically conductive material plugs 119 are in direct electrical contact with the strip member 84 at each proximal opening 98 of each passageway 96. Similarly, the electrically conductive material plugs 119 are in direct electrical contact with the first anode material 38 at each of the distal openings 100 of the passageways 96. In this manner, the first anode material 38 is electrically connected with the strip member 84 through the passagaeways 96 so that the first anode material 38 effectively shorts out the resistive strip member 84 such that a voltage potential is developed between the sensing wire 30 through the uppermost plug 119, the anode material 38, electrolyte, cathode material 42 and the conductive case 16.

As the first anode material 38 is consumed, the electrolyte is exposed to and comes into electrochemical contact with the electrically conductive material plug contained within the upper passageways 96. The electrically conductive material is then oxidized by the electrolyte and becomes nonconductive so that that portion of the strip member 84 previously in electrical contact with the first anode material 38 through the upper electrically conductive material plugs 119 are no longer in electrical contact with the first anode material 38 since the electrically conductive material within the passageways 96 is no longer electrically conductive. The oxidized layer is identified by reference numeral 121 in FIG. 8. Accordingly, there is an increase in resistance between the first anode material 38 and the sensing wire 30. This resistance of the conductive strip member or sensor 84 is measured by applying a sinusoidal voltage pulse of about 1 v (peak-to-peak) and 1 kilo hertz across the sensor 84. The pulse duration may be 1 second or longer.

It is apparent that since the depletion gauge 12 is disposed within the first anode material 38 on an angle, the distance between the distal openings 100 of the passageways 96 and the inner insulative separator 60, or between the distal openings 100 of the passageways 96 and the second major surface 80 of the first anode material 38, increase linearly from the proximal end 36 of the depletion gauge 12 to the distal end 82 of the depletion gauge 12. Accordingly, as the first anode material 38 is consumed, the electrically conductive material plugs 119 within the passageways 96 at the proximal end 36 of the depletion gauge 12 are exposed to the electrolyte and the plugs 119 therebelow are not exposed. As a result, the passageways 96 below the exposed passageways 96 contain the nonoxidized electrically conductive material plugs 119 which are in direct electrical contact with the first anode material 38 and the strip member 84. As the first anode material 38 is consumed, the number of plugs 119 exposed to the electrolyte increases with the result that the amount of resistance of the strip member 84 connected in series between the anode material 38 and the conductor 30 increases.

It is to be appreciated that according to the teachings of the present invention, the electrolyte contained within the inner and outer insulative separators 60, 62 and within the open area 64 is preferably thionyl chloride, and the electrically conductive material of the plugs 119 contained within the passageways 96 can be selected from a number of electrically conductive materials which are readily oxidizable to a nonconductive state by the thionyl chloride electrolyte.

In one embodiment of the present invention, the electrically conductive material is silver, so that the electrochemical reaction between the thionyl chloride electrolyte and the silver within the passageways 96 forms silver chloride within the passageways 96, which is a nonconductive material.

In another embodiment of the present invention, the electrically conductive material is lithium, so that the electrochemical reaction between the thionyl chloride electrolyte and the lithium within the passageways 96 forms lithium chloride, which is a nonconductive material.

In still another embodiment of the present invention, the electrically conductive material is a conductive polymer which is doped to the "n" or nonconductive state when reacting with the thionyl chloride electrolyte. Preferably, the conductive polymer within the passageways 96 in this embodiment is selected from the group comprising polypyrole, poly-paraphenylene, polyphenylene sulfide or polyacetylene.

When the electrically conductive material within all of the passageways 96 of the depletion gauge 12 has been exposed to the electrolyte and has become non-conductive, the strip member 84 is no longer electrically connected to the first anode material 38 so that an "open circuit" condition will exist between the sensing wire 30 and the conductive case 16. However, since the second anode material 40 is not entirely consumed at that point in time when the strip member 84 is no longer in contact with the first anode material 38, the second anode material 40 will provide a voltage potential sufficient to provide an electrical current to an external load of the cell 10.

Accordingly, the electrochemical cell 10 of the present invention having a continuous depletion gauge 12 has a number of advantages, some of which have been described above, and others of which are inherent in the invention. Also, modifications can be made to the electrochemical cell 10 without departing from the teachings of the present invention. Accordingly, the scope of the invention is only to be limited as necessitated by the accompanying claims.

I claim:

1. An electrochemical cell comprising: an outer conductive housing; a cathode material within said housing, said cathode material being in direct electrical contact with said housing; at least a first anode material within said housing, said first anode material including first and second major surfaces; porous insulating means separating said cathode material from said first anode material; an electrolyte within said housing and within said porous insulating means; a conductive resistive strip member positioned within said first anode material, having a distal end and a proximal end and extending generally diagonally through said first anode material between said major surfaces of said first anode material; means for insulating said strip member from said first anode material; means for establishing electrical connections between said first anode material and said conductive strip member, said means for establishing electrical connections being capable of being rendered non-conductive when in contact with said electrolyte; and an electrical conductor connected to said proximal end of said strip member and extending out of and insulated from said conductive housing whereby an initial voltage is developed between said electrical conductor and said housing and, as the anode material is used up and more electrical connections are rendered non-conductive, the number of non-conductive electrical connections between said electrolyte and said conductive strip member controls the amount of electrical resistance of said strip member between said first anode material and said electrical conductor, the increase in resistance of said strip member during consumption of said first anode material serving to indicate the level of discharge of said cell.

2. The cell of claim 1 wherein said conductive strip member is rectangular in cross-section and includes first and second major surfaces.

3. The cell of claim 1 wherein said conductive strip member is approximately 500 angstroms thick.

4. The cell of claim 1 wherein said conductive strip member is approximately 0.010 inch wide.

5. The cell of claim 1 wherein said conductive strip member is approximately 0.50 inch long.

6. The cell of claim 1 wherein said conductive strip member is made of metallic material.

7. The cell of claim 6 wherein said metallic material is nichrome.

8. The cell of claim 1 wherein said strip member extends in a generally downward direction from said first major surface of said first anode material to said second major surface of said first anode material, said first major surface of said proximal end of said strip member being coplanar with said first major surface of said first anode material and said second major surface of said strip member being coplanar with said second major surface of said first anode material.

9. The cell of claim 1 wherein said means for insulating said strip member from said first anode material includes at least first and second layers of insulating material, said first layer being located on said first major surface of said strip member and said second layer being located on said second major surface of said strip member.

10. The cell of claim 9 wherein said means for establishing electrical connections extend through said first layer of insulating material between said first anode material and said strip member.

11. The cell of claim 9 wherein said first layer of insulating material has a plurality of passageways extending therethrough between said first anode material and said strip member, said passageways being spaced apart in a row between said proximal and distal ends of said strip member, and said means for establishing electrical connections between said first anode material and said strip member comprising electrically conductive material in each passageway.

12. The cell of claim 11 wherein said electrically conductive material is in direct electrical contact with said conductive strip member and a portion of said first anode material.

13. The cell of claim 11 wherein said electrically conductive material is made of a material which is readily oxidizable by said electrolyte so as to be rendered non-conductive when exposed to the electrolyte.

14. The cell of claim 9 wherein said first layer of insulating material is made of a non-conductive polymer.

15. The cell of claim 14 wherein said non-conductive polymer is polyimide.

16. The cell of claim 9 wherein said first layer of insulating material is approximately 0.002 inch thick.

17. The cell of claim 9 wherein said first layer of insulating material is approximately 0.050 inch wide.

18. The cell of claim 9 wherein said first layer of insulating material is approximately 0.050 inch long.

19. The cell of claim 11 wherein said passageways are circular in cross-section.

20. The cell of claim 11 wherein the diameter of said passageways is approximately equal to the width of said conductive strip member.

21. The cell of claim 20 wherein said diameter of said passageways is approximately 0.010 inch.

22. The cell of claim 9 wherein said second layer of insulating material is made of halar.

23. The cell of claim 9 wherein said second layer of insulating material is approximately 0.005 inch thick.

24. The cell of claim 9 wherein said second layer of insulating material is approximately 0.050 inch wide.

25. The cell of claim 9 wherein said second layer of insulating material is approximately 0.050 inch long.

26. The cell of claim 1 wherein said electrolyte is thionyl chloride.

27. The cell of claim 13 wherein said readily oxidizable material is silver.

28. The cell of claim 13 wherein said readily oxidizable material is lithium.

29. The cell of claim 13 wherein said readily oxidizable material is a conductive polymer.

30. The cell of claim 29 wherein said conductive polymer is selected from the group comprising polypyrole, poly-paraphenylene, polyphenuylene sulfide or polyacetylene.

31. The cell of claim 1 including a current collector plate interposed between said second major surface of said first anode material and said porous insulating means, said current collector plate having a first major surface and a second major surface, said first major surface of said current collector plate being in direct electrical contact with said second major surface of said first anode material.

32. The cell of claim 31 including an anode lead, said anode lead being electrically connected to said current collector plate and extending out of and insulated from said conductive housing.

33. The cell of claim 1 including a second anode material interposed between said second major surface of said current collector plate and said porous insulating means, and said first major surface of said second anode material being in direct electrical contact with said second major surface of said collector plate.

* * * * *